Feb. 1, 1955　　　W. H. DIETZ　　　2,701,139
PUZZLE
Filed July 17, 1952
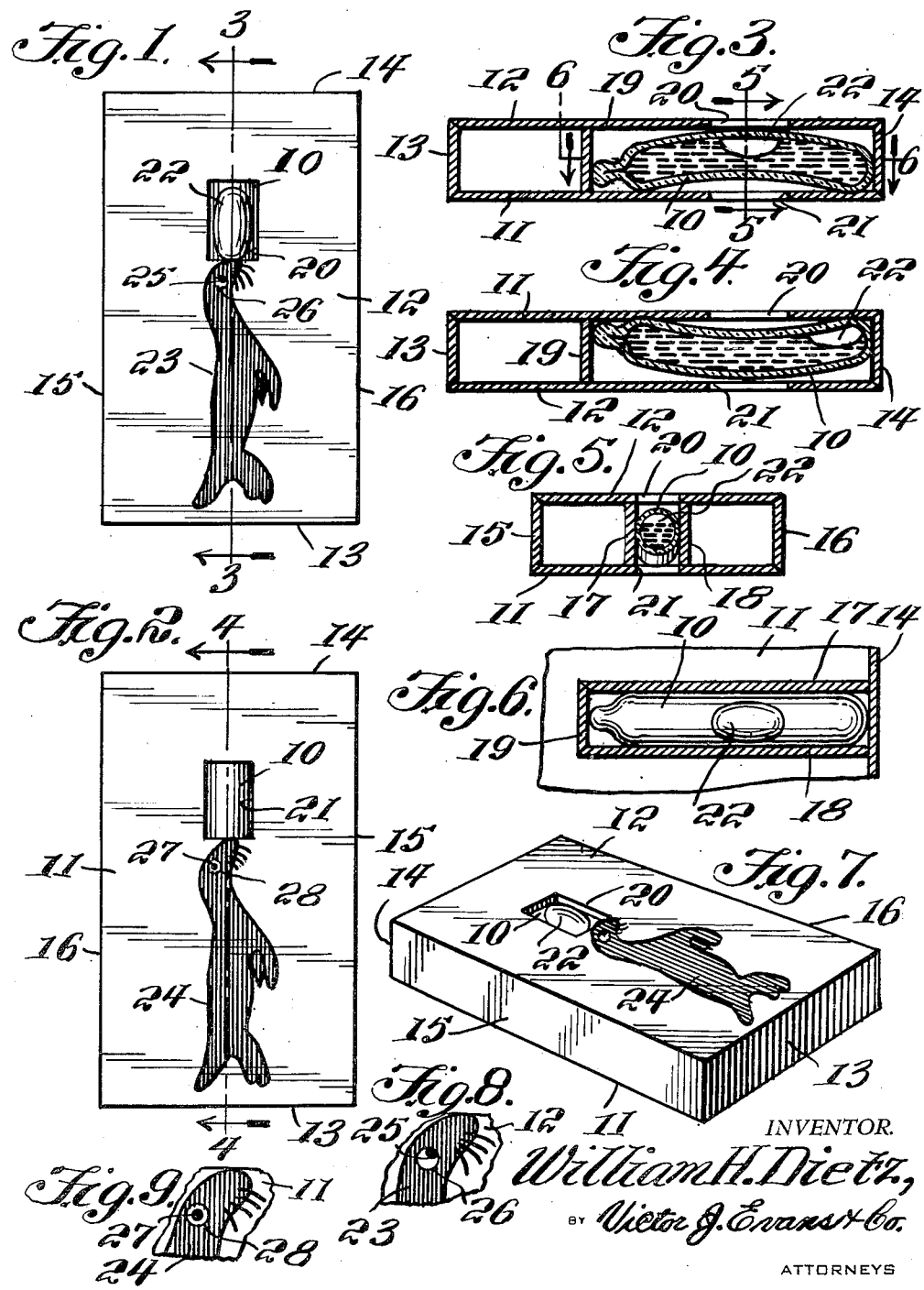

United States Patent Office 2,701,139
Patented Feb. 1, 1955

2,701,139

PUZZLE

William H. Dietz, Pittsburgh, Pa.

Application July 17, 1952, Serial No. 299,453

1 Claim. (Cl. 273—153)

This invention relates to novelties particularly in the form of puzzles, and in particular the invention includes a bubble tube, such as used in a spirit level with the tube curved longitudinally and positioned in a housing with registering openings in the sides whereby with the tube positioned so that the high point in the intermediate part thereof is close to one side a bubble in the tube registers with the nose of an animal displayed on the face of the housing whereas with the position of the housing reversed whereby the low point of the tube registers with the opening in the wall of the housing it is difficult to position the bubble so that it registers with part of an animal displayed on the housing.

The purpose of this invention is to provide a novelty or trick which is adapted to be successfully operated when positioned with one side up and which is substantially impossible to operate with the opposite side facing upwardly.

Various types of puzzles have been provided in which objects are balanced and in which balls and other objects are carried through interrupted tracks, and whereas such devices have novelty it has been found that by curving the glass of a spirit level a new device is provided, and the new device will operate in one position and not in the reverse position as the bubble will seek the high point in the glass. With this thought in mind this invention contemplates a device in which the bubble of a spirit level glass may readily be positioned in an opening with the device in one position whereas with the position of the device reversed the device is, apparently inoperative.

The object of this invention is, therefore, to provide means for mounting an arcuate spirit level glass in a housing whereby a bubble in the glass registers with an opening through the housing with the housing in one position and refuses to remain in the position wherein it registers with the opening with the housing in another position.

Another object of the invention is to provide a novelty or trick in which a bubble in a spirit level glass, representing a balloon, may be positioned where it appears to be balanced on the nose or other part of an animal.

A further object of the invention is to provide a novelty having an arcuate spirit level glass therein with a bubble in the glass positioned to register with parts of an animal on a housing in which the glass is positioned in which the device is of a simple and economical construction.

With these and other objects and advantages in view the invention embodies a substantially hollow casing having spaced side walls with registering openings therethrough and having a representation of an animal or the like on both sides, and having an arcuate spirit level glass mounted between the walls and positioned whereby a bubble therein registers with the openings through the walls with the device in a horizontal position and with the wall corresponding with the high side of the glass extended upwardly.

Other features and advantages of the invention will appear from the following description taken in connection with the drawing, wherein:

Figure 1 is a plan view of the novelty with the high side of the bubble glass extended upwardly whereby the bubble registers with an opening through the device.

Figure 2 is a view similar to that shown in Fig. 1 with the position of the device reversed wherein the low side of the glass is positioned to register with the opening of the device.

Figure 3 is a longitudinal section through the device taken on line 3—3 of Fig. 1 and showing the bubble registering with the openings through the device.

Figure 4 is a longitudinal section taken on line 4—4 of Fig. 2 showing the position of the device reversed wherein the bubble is positioned in an end of the tube.

Figure 5 is a cross section through the device taken on line 5—5 of Fig. 3.

Figure 6 is a detail showing a section taken on line 6—6 of Fig. 3 illustrating the mounting of the glass.

Figure 7 is a perspective view illustrating the general construction of the device and showing the device positioned with the high side of the glass extended upwardly as shown in Figs. 1 and 3.

Figure 8 is a detail showing the head of the animal positioned on the wall of the housing wherein the eye is positioned to indicate that the high or correct side of the device is turned upwardly.

Figure 9 is a similar view showing the pupil of the eye in the center to indicate the incorrect position of the device.

Referring now to the drawing wherein like reference characters denote corresponding parts the improved novelty of this invention includes an arcuate or bowed tubular bubble glass 10 positioned in a housing having a base 11, a cover 12, end walls 13 and 14, side walls 15 and 16 and an inner compartment having side walls 17 and 18 and an end wall 19.

The cover 12 is provided with an opening 20 and a corresponding opening 21 is provided in the base. With the openings aligned as shown in Figs. 3 and 4 light passes directly through the housing whereby the position of a bubble, as indicated by the numeral 22 in the glass 10 may readily be observed when the housing is positioned so that the bubble is in registering relation with the openings 20 and 21.

In the design shown a seal, as indicated by the numeral 23 is illustrated on the cover 12 and an oppositely positioned seal, as indicated by the numeral 24 is positioned on the base 11. As illustrated in Fig. 8 the pupil 25 of the eye 26 of the seal 23, on the cover 12 is positioned in the upper edge of the eye indicating that the seal is looking toward a balloon represented by the bubble 22 whereas, as illustrated in Fig. 9 a pupil 27 of the eye 28 of the seal 24 on the base 11 is positioned in the center of the eye, indicating that the bubble does not appear in the opening with the housing positioned with this side extended upwardly. By this means an operator may readily determine which is the correct side to be held upwardly when it is desired to position the bubble or balloon on the novelty.

The device is therefore adapted to be used as a trick with the operator holding the correct side upwardly showing that a balloon represented by the bubble may readily be balanced on the nose of the seal and in handing the device to another person the operator turns the device over with a sleight of hand movement whereby it is substantially impossible for the second person to hold the bubble or balloon on the nose of the seal.

It will be understood that modifications, within the scope of the appended claim, may be made in the design and arrangement of the parts without departing from the spirit of the invention.

What is claimed is:

A toy puzzle comprising a box-like housing comprising two opaque spaced parallel walls with registering openings through the walls, and a bowed tubular bubble glass having a high point midway between its ends mounted between the walls with its ends adjacent one wall and with its high point adjacent the other wall and in registering relation with said openings, whereby with the walls horizontally positioned and turned with the wall against which the high point of the glass is positioned extended upwardly the bubble remains in said high point and shows through the opening, and with the position of the housing reversed wherein the side of the glass on which the high point is located is positioned downwardly the bubble will be located in one of the ends of the glass and will not be visible through the openings of the walls, and substantially duplicate and similarly positioned representations of a creature on the outer surfaces of the walls and positioned with the nose of the creature adjacent to the opening in each respective wall, whereby the bubble can be positioned against the nose of the creature when the side of the housing upon which the high side of the glass is positioned faces upwardly and cannot be made to register with the nose of the creature with the position of the housing reversed.

References Cited in the file of this patent

UNITED STATES PATENTS

| | | |
|---|---|---|
| 473,217 | Fithian | Apr. 19, 1892 |
| 1,488,419 | Ward | Mar. 25, 1924 |
| 2,240,807 | Shaw | May 6, 1941 |

FOREIGN PATENTS

| | | |
|---|---|---|
| 559,325 | Great Britain | Feb. 14, 1944 |
| 627,430 | Great Britain | Aug. 9, 1949 |